United States Patent
Wylie

(10) Patent No.: US 11,725,608 B2
(45) Date of Patent: Aug. 15, 2023

(54) PASSIVELY ACTUATED VARIABLE AREA NOZZLE FOR AN AIRCRAFT PROPULSION SYSTEM

(71) Applicant: Rohr, Inc., Chula Vista, CA (US)

(72) Inventor: Steve A. Wylie, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 77 days.

(21) Appl. No.: 17/734,723

(22) Filed: May 2, 2022

(65) Prior Publication Data
US 2022/0403796 A1    Dec. 22, 2022

Related U.S. Application Data

(63) Continuation of application No. 17/317,380, filed on May 11, 2021, now abandoned.

(60) Provisional application No. 63/025,346, filed on May 15, 2020.

(51) Int. Cl.
*F02K 1/12* (2006.01)

(52) U.S. Cl.
CPC ...... *F02K 1/1207* (2013.01); *F05D 2220/323* (2013.01)

(58) Field of Classification Search
CPC . F02K 1/06; F02K 1/12; F02K 1/1207; F02K 1/1215; F05D 2220/323
See application file for complete search history.

(56) References Cited

U.S. PATENT DOCUMENTS

| | | | | |
|---|---|---|---|---|
| 2,880,575 A | * | 4/1959 | Scialla | F02K 1/1223 239/455 |
| 2,928,238 A | | 3/1960 | Hawkins, Jr. | |
| 2,957,458 A | * | 10/1960 | Caulfield | F02K 1/1207 123/41.7 |
| 3,716,207 A | * | 2/1973 | Schweikl | F02K 1/62 239/265.29 |
| 3,943,707 A | * | 3/1976 | Nash | F02K 1/002 239/265.29 |
| 3,979,067 A | * | 9/1976 | Nash | F02K 1/1215 244/12.5 |
| 4,587,806 A | * | 5/1986 | Madden | F02K 1/12 244/12.5 |

(Continued)

FOREIGN PATENT DOCUMENTS

| | | | | |
|---|---|---|---|---|
| GB | | 967780 A | 8/1964 | |
| WO | WO-2014160486 A1 | * | 10/2014 | ........... F02K 1/1207 |

*Primary Examiner* — Craig Kim
(74) *Attorney, Agent, or Firm* — Getz Balich LLC

(57) ABSTRACT

An aircraft system includes a propulsion system structure, a variable area nozzle and a linkage system. The propulsion system structure is moveable between a first position and a second position. The variable area nozzle is fluidly coupled with a duct in the propulsion system structure. The variable area nozzle is moveable between a first configuration and a second configuration. An exit area of the variable area nozzle has a first value when the variable area nozzle is in the first configuration and a second value when the variable area nozzle is in the second configuration. The variable area nozzle includes a flap moveably connected to the propulsion system structure. The linkage system mechanically links the variable area nozzle with the propulsion system structure. The linkage system includes a driver linkage, a first bell crank, a bridge linkage, a second bell crank, a follower linkage and a crank arm.

14 Claims, 13 Drawing Sheets

(56) References Cited

U.S. PATENT DOCUMENTS

| | | | | |
|---|---|---|---|---|
| 4,767,055 A * | 8/1988 | Ward | ............... | F02K 1/1223 |
| | | | | 239/265.29 |
| 4,804,155 A * | 2/1989 | Strumbos | ............ | B64C 25/423 |
| | | | | 244/12.6 |
| 5,390,877 A * | 2/1995 | Nightingale | ........... | F02K 1/006 |
| | | | | 244/12.5 |
| 6,607,162 B2 * | 8/2003 | Warsop | ............... | B64C 39/062 |
| | | | | 244/12.6 |
| 7,364,115 B2 | 4/2008 | Parks | | |
| 9,885,314 B2 | 2/2018 | Lumbab | | |
| 10,293,914 B2 | 5/2019 | Wiegand | | |
| D874,382 S | 2/2020 | Wiegand | | |
| 10,570,926 B2 | 2/2020 | Maciolek | | |
| 10,597,133 B2 | 3/2020 | Wiegand | | |
| 2011/0147533 A1 | 6/2011 | Goossen | | |
| 2016/0023754 A1 | 1/2016 | Wiegand | | |
| 2016/0311522 A1 | 10/2016 | Wiegand | | |
| 2017/0159674 A1 | 6/2017 | Maciolek | | |
| 2017/0203839 A1 | 7/2017 | Giannini | | |
| 2018/0080410 A1 * | 3/2018 | Pesyna | ..................... | F02K 1/12 |
| 2019/0078533 A1 * | 3/2019 | Simpson | ............... | B64D 33/04 |
| 2019/0217937 A1 | 7/2019 | Wiegand | | |
| 2020/0047896 A1 | 2/2020 | Dierksmeier | | |
| 2020/0354051 A1 * | 11/2020 | Besse | ........................ | F02K 1/06 |
| 2022/0018309 A1 * | 1/2022 | Wylie | ...................... | F02K 1/12 |
| 2022/0307447 A1 * | 9/2022 | Boone | ...................... | F02K 3/02 |

\* cited by examiner

PASSIVELY ACTUATED VARIABLE AREA NOZZLE FOR AN AIRCRAFT PROPULSION SYSTEM

This application is a continuation of U.S. patent application. Ser. No. 17/317,380 filed May 11, 2021, which claims priority to provisional U.S. patent application Ser. No. 63/025,346 filed May 15, 2020, each of which is hereby incorporated herein by reference in its entirety.

BACKGROUND

1. Technical Field

This disclosure relates generally to an aircraft and, more particularly, to a variable area nozzle for an aircraft propulsion system.

2. Background Information

An aircraft propulsion system may include a variable area nozzle. Various types and configurations of variable area nozzles are known in the art. While these known variable area nozzles have various benefits, there is still room in the art for improvement. In particular, there is a need in the art for an improved system for actuating movement of a variable area nozzle that may simplify design, reduce costs, reduce maintenance, etc.

SUMMARY OF THE DISCLOSURE

According to an aspect of the present disclosure, an aircraft system is provided that includes a propulsion system structure, a variable area nozzle and a linkage system. The propulsion system structure includes a duct. The propulsion system structure is adapted to move between a first position and a second position. The variable area nozzle is fluidly coupled with the duct. The variable area nozzle is adapted to move between a first configuration and a second configuration. An exit area of the variable area nozzle has a first value when the variable area nozzle is in the first configuration. The exit area of the variable area nozzle has a second value when the variable area nozzle is in the second configuration. The variable area nozzle includes a flap moveably connected to the propulsion system structure. The linkage system is configured to mechanically link movement of the variable area nozzle between the first configuration and the second configuration with movement of the propulsion system structure between the first position and the second position. The linkage system includes a driver linkage, a first bell crank, a bridge linkage, a second bell crank, a follower linkage and a crank arm. The first bell crank couples the driver linkage to the bridge linkage. The second bell crank couples the bridge linkage to the follower linkage. The crank arm couples the follower linkage to the flap.

According to another aspect of the present disclosure, another aircraft system is provided that includes a propulsion system structure, a variable area nozzle and a linkage system. The propulsion system structure includes a duct. The propulsion system structure is adapted to move between a first disposition and a second disposition that is angularly offset from the first disposition. The variable area nozzle is fluidly coupled with and downstream of the duct. The linkage system is adapted such that movement of the propulsion system structure between the first disposition and the second disposition drives actuation of the variable area nozzle through the linkage system. The linkage system includes: (A) a first bell crank, a second bell crank and a bridge linkage coupled to and between the first bell crank and the second bell crank; or (B) a pulley with a tension member engaged with the pulley.

According to still another aspect of the present disclosure, another aircraft system is provided that includes an aircraft effector, a variable area nozzle and a linkage system. The aircraft effector is adapted to move between a first position and a second position. The linkage system includes a pulley system. The linkage system is adapted such that movement of the aircraft effector between the first position and the second position mechanically drives actuation of the variable area nozzle through the linkage system using the pulley system. The pulley system includes a first pulley, a second pulley and a tension member engaged with the first pulley and the second pulley.

The actuation of the variable area nozzle may include movement of the variable area nozzle between a first configuration and a second configuration. An exit area of the variable area nozzle may have a first value when the variable area nozzle is in the first configuration. The exit area of the variable area nozzle may have a second value when the variable area nozzle is in the second configuration.

The aircraft effector may be configured as or otherwise include a propulsion duct. The variable area nozzle may be fluidly coupled with and downstream of the propulsion duct.

The movement of the propulsion system structure between the first position and the second position may drive the movement of the variable area nozzle between the first configuration and the second configuration.

Movement of the variable area nozzle from the first configuration towards the second configuration may begin when the propulsion system structure moves from the first position towards the second position.

Movement of the variable area nozzle from the first configuration towards the second configuration may begin when the propulsion system structure moves from an intermediate position towards the second position. The intermediate position may be between the first position and the second position.

The aircraft system may also include a stationary structure. The linkage system may be coupled to the stationary structure, the propulsion system structure and the variable area nozzle. The linkage system may be adapted to move the variable area nozzle between the first configuration and the second configuration as the propulsion system structure moves relative to the stationary structure between the first position and the second position.

The propulsion system structure may be movably connected to the stationary structure.

The linkage system may include a track and a slider mated with and slidable along the track.

The aircraft system may also include a fixed structure. The propulsion system structure may be pivotally coupled to the fixed structure such that the propulsion system structure pivots between the first position and the second position.

The variable area nozzle may also include a second flap. The first flap may be pivotally coupled to the propulsion system structure at a first side of the propulsion system structure. The second flap may be pivotally coupled to the propulsion system structure at a second side of the propulsion system structure that may be opposite the first side of the propulsion system structure.

The aircraft system may include a propulsor of an aircraft propulsion system. The propulsor may be housed within the propulsion system structure.

A centerline of the duct when the propulsion system structure is in the first position may be angularly offset from the centerline of the duct when the propulsion system structure is in the second position.

The variable area nozzle may also include a second flap moveably connected to the propulsion system structure. The linkage system may also include a second follower linkage and a second crank arm. The first bell crank may also couple the driver linkage to the second follower linkage. The second crank arm may couple the second follower linkage to the second flap.

The linkage system may also include an aircraft structure crank arm. The driver linkage may couple the aircraft structure crank arm to the first bell crank.

The aircraft system may also include a stationary structure. The propulsion system structure may be movably connected to the stationary structure. The aircraft structure crank arm may be fixedly attached to the stationary structure.

The variable area nozzle may include a first flap and a second flap. The linkage system may include the first bell crank, the second bell crank and the bridge linkage. The linkage system may also include a driver linkage, a first follower linkage and a second follower linkage. The first bell crank may couple the driver linkage to the bridge linkage and the second follower linkage. The second bell crank may couple the bridge linkage to the first follower linkage. The first follower linkage may be configured to actuate movement of the first flap. The second follower linkage may be configured to actuate movement of the second flap.

The linkage system may also include a first crank arm and a second crank arm. The first crank arm may couple the first follower linkage to the first flap. The second crank arm may couple the second follower linkage to the second flap.

The aircraft system may also include a stationary structure. The propulsion system structure may be movably connected to the stationary structure. The linkage system may also include an aircraft structure crank arm fixedly attached to the stationary structure. The driver linkage may couple the aircraft structure crank arm to the first bell crank.

The linkage system may include the pulley and the tension member. The linkage system may also include a second pulley. The tension member may be engaged with and span between the first pulley and the second pulley.

The present disclosure may include any one or more of the individual features disclosed above and/or below alone or in any combination thereof The foregoing features and the operation of the invention will become more apparent in light of the following description and the accompanying drawings.

DETAILED DESCRIPTION

Figure 1:
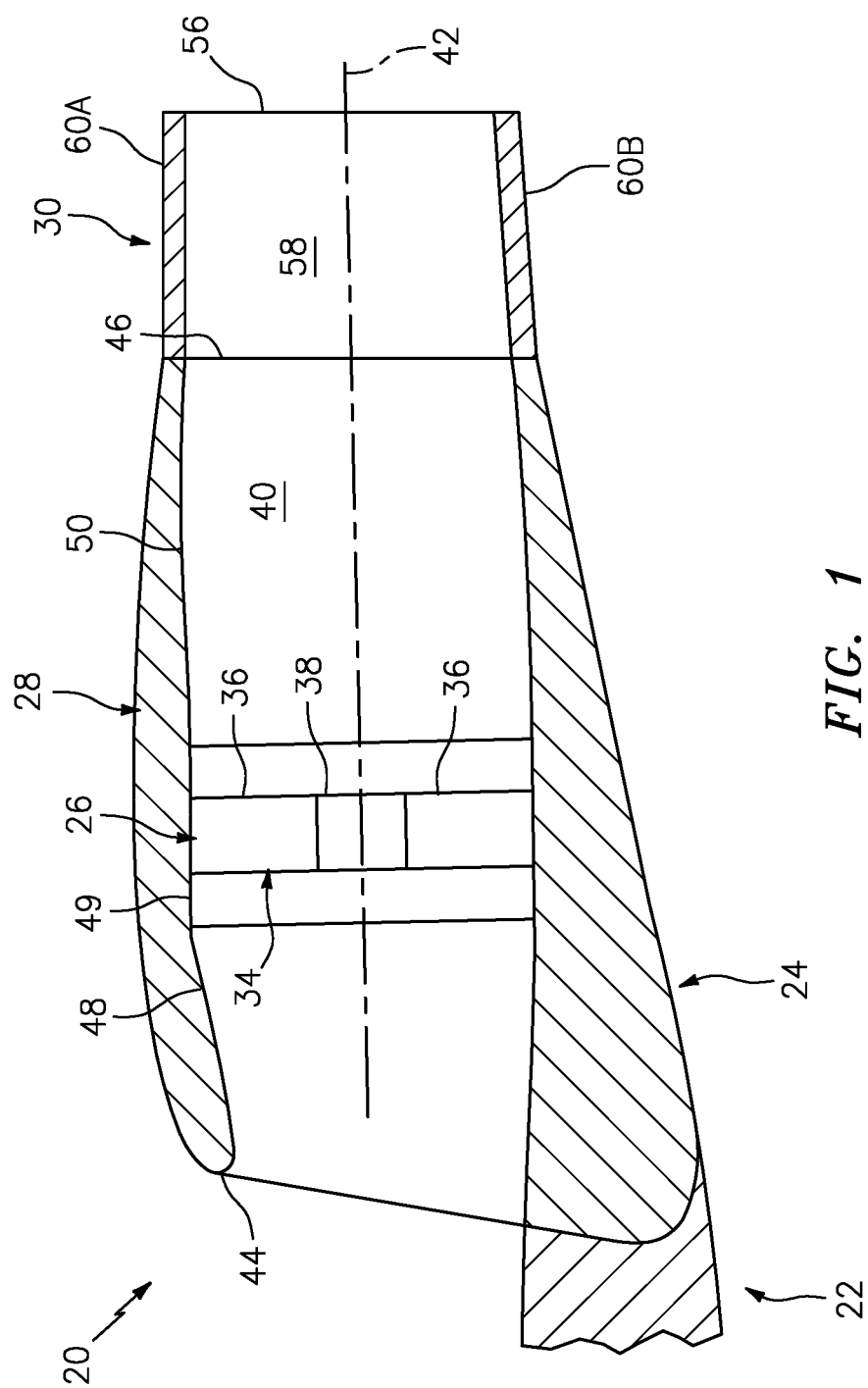
FIG. 1 is a side sectional illustration of a system for an aircraft at a first lateral location.

FIG. 1 illustrate a system 20 for an aircraft. The aircraft may be configured as a manned aircraft or an unmanned aircraft (also referred to as an unmanned aerial vehicle (UAV) or a drone). For ease of description, the aircraft is described below as a fixed wing vertical take-off and landing (VTOL) aircraft, which aircraft is configured for vertical takeoff, vertical landing and/or hovering. The present disclosure, however, is not limited to vertical take-off and landing aircraft nor fixed wing aircraft. Rather, embodiments of the disclosed aircraft system 20 may be configured with any aircraft configured with a variable area nozzle for a propulsion system.

Figure 2:
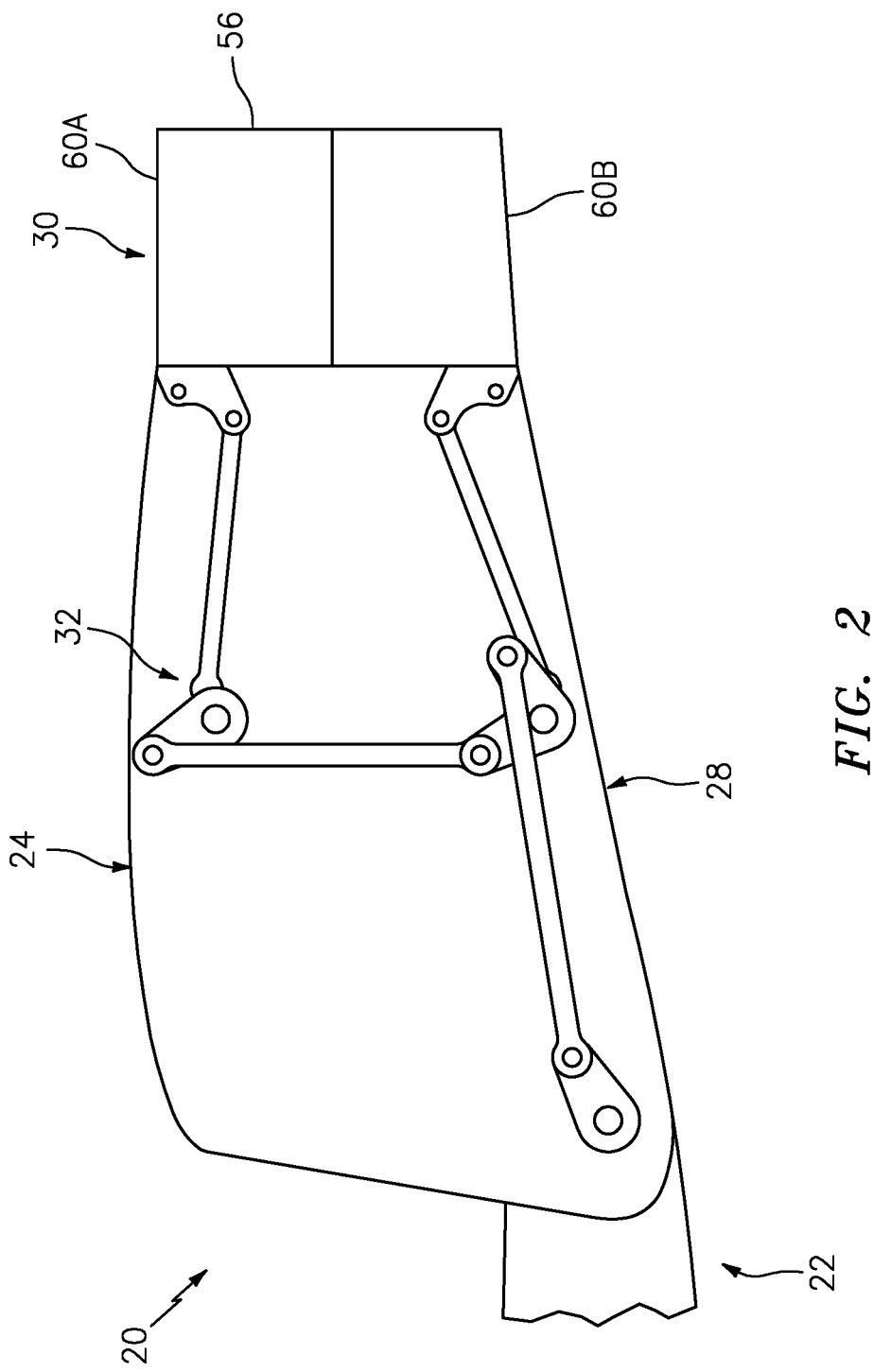
FIG. 2 is a side sectional illustration of the aircraft system at a second lateral location.

The aircraft system 20 of FIG. 1 includes an aircraft structure 22 and an aircraft propulsion system 24. The propulsion system of FIG. 1 includes a propulsor 26 (shown in block diagram form), a propulsion system structure 28 and a variable area nozzle 30 (VAN). Referring to FIG. 2, the aircraft propulsion system 24 also includes a linkage system 32 for the variable area nozzle 30.

The aircraft structure 22 of FIG. 1 is configured as a fixed (e.g., stationary) structure of the aircraft. The aircraft structure 22, for example, may be configured as a wing of the aircraft. In another example, the aircraft structure 22 may be configured as a pylon structure that mounts the aircraft propulsion system 24 to another component of the aircraft. For example, the pylon structure may mount the aircraft propulsion system 24 to an aircraft fuselage or an aircraft wing. The present disclosure, of course, is not limited to the foregoing aircraft structure configurations.

The propulsor 26 of FIG. 1 includes a propulsor rotor 34 such as, but not limited to, a fan rotor. This propulsor rotor 34 is configured rotate about a rotational axis. The propulsor rotor 34 of FIG. 1 includes a plurality of propulsor blades 36 (e.g., fan blades) arranged circumferentially about and connected to a rotor disk 38.

The propulsion system structure 28 is configured as a structural housing, casing and/or nacelle for one or more components of the aircraft propulsion system 24. The propulsion system structure 28 of FIG. 1, for example, is configured to house the propulsor 26 within a flow passage 40.

The passage 40 extends longitudinally along a longitudinal centerline 42 through the propulsion system structure 28 between and to a passage first (e.g., forward/upstream) end 44 and a passage second (e.g., aft/downstream) end 46. The passage 40 of FIG. 1 includes one or more ducts such as, but not limited to, an intake duct 48, a propulsor duct 49 (e.g., a fan duct) and a propulsion duct 50 (e.g., an exhaust duct). These ducts 48-50 are arranged sequentially along the longitudinal centerline 42 between the passage first end 44 and the passage second end 46. For example, the intake duct 48 is disposed at the passage first end 44. The propulsor duct 49 is configured to house and contain the propulsor 26. The propulsion duct 50 of FIG. 1 extends longitudinally along the longitudinal centerline 42 between and to the intake duct 48 and the propulsor duct 49. The propulsion duct 50 is disposed at the passage second end 46.

Figure 3A:
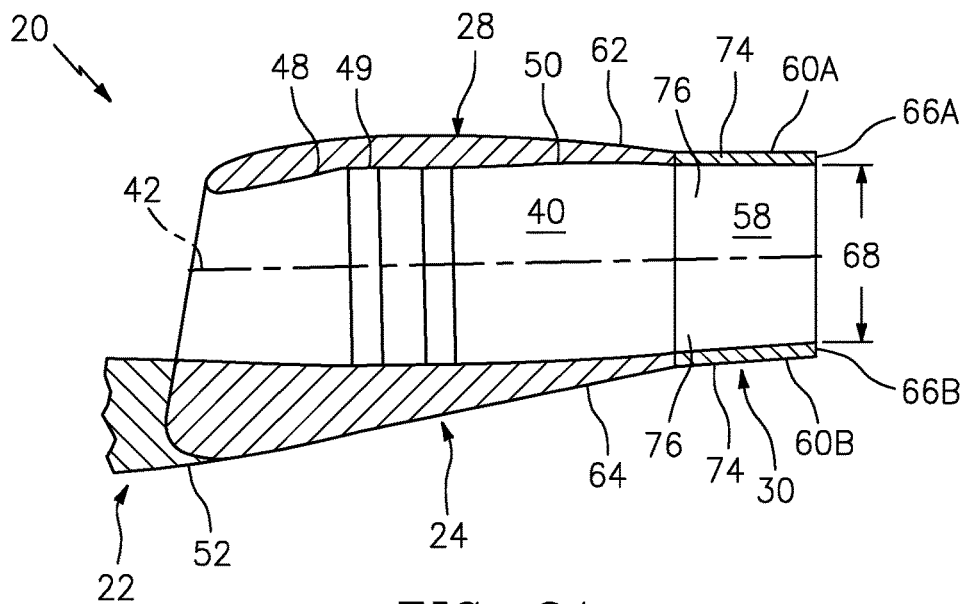
FIG. 3A is a side sectional illustration of the aircraft system in a first (e.g., horizontal) thrust configuration.
Figure 3B:
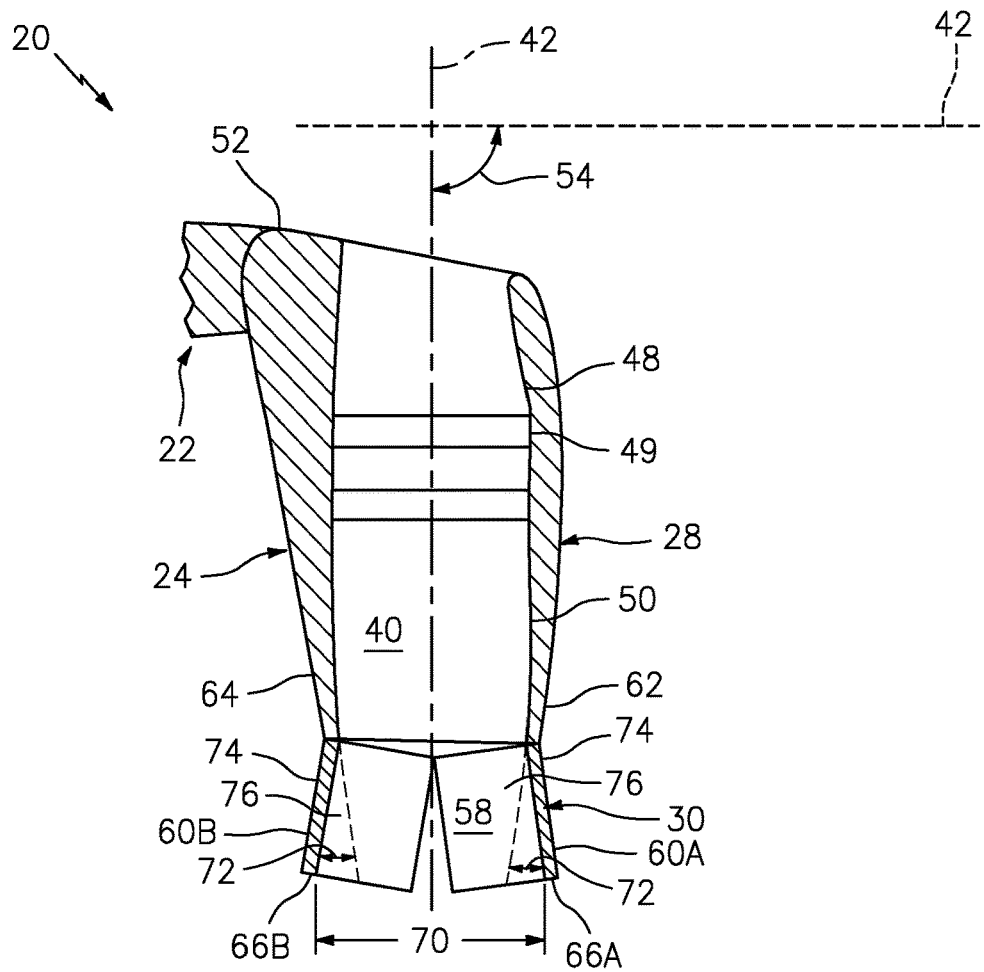
FIG. 3B is a side sectional illustration of the aircraft system in a second (e.g., vertical) thrust configuration.

Referring to FIGS. 3A and 3B, the propulsion system structure 28 is adapted to move (e.g., pivot) between a first position (see horizontal flight position of FIG. 3A) and a second position (see vertical flight position of FIG. 3B). The propulsion system structure 28 of FIGS. 3A and 3B, for example, is movably (e.g., pivotally) coupled to the aircraft structure 22 at, for example, a trailing end/edge 52 of the aircraft structure 22.

When the propulsion system structure 28 is in the first position of FIG. 3A, the aircraft propulsion system 24 is configured to provide substantially horizontal thrust. The aircraft propulsion system 24 may thereby be configured to move/propel the aircraft, for example, substantially in a horizontal (e.g., forward) direction. In the first position, the propulsion system structure 28 is at a first disposition where the longitudinal centerline 42 is, for example, substantially horizontal.

When the propulsion system structure 28 is in the second position of FIG. 3B, the aircraft propulsion system 24 is configured to provide substantially vertical thrust. The aircraft propulsion system 24 may thereby be configured to move/propel the aircraft, for example, in a substantially vertical (e.g., up or down) direction. The aircraft propulsion system 24 may also be configured to hover the aircraft. In the second position, the propulsion system structure 28 is at a second disposition where the longitudinal centerline 42 is, for example, substantially vertical. Therefore, the propulsion system structure 28, its duct(s) 48-50 and its longitudinal centerline 42 when in the second position/second disposition is angularly offset by an offset angle 54 from the propulsion system structure 28, its duct(s) and its longitudinal centerline 42 when in the first position/first disposition. The offset angle 54 may be exactly or about (e.g., +/-2°) ninety degrees)(90°). Of course, in other embodiments, the offset angle 54 may be more than ninety degrees (or the about ninety degrees) or less than ninety degrees (or the about ninety degrees).

The variable area nozzle 30 of FIG. 1 is fluidly coupled with and downstream of the passage 40 and its ducts 48-50. More particularly, the variable area nozzle 30 is arranged at the passage second end 46. The variable area nozzle 30 has an exit area at its downstream/trailing end 56. The term "exit area" may describe an area of an outlet passage 58 defined by the variable area nozzle 30 in a plane, for example, perpendicular to the longitudinal centerline 42.

Referring to FIGS. 3A and 3B, the exit area is a variable area that changes as the variable area nozzle 30 moves between a first configuration (see restricted/closed configuration of FIG. 3A) and a second configuration (see unrestricted/open configuration of FIG. 3B). A first (e.g., restricted/closed) value of the exit area while the variable area nozzle 30 is in the first configuration is less than a second (e.g., unrestricted/open) value of the exit area while the variable area nozzle 30 is in the second configuration. The second value, for example, may be equal to or more than one hundred and five percent (105%) or one hundred and ten percent (110%) of the first value. For example, the second value may be between one hundred and fifteen percent (115%) and one hundred and forty-five percent (145%) of the first value; e.g., one hundred and twenty-five percent (125%), one hundred and thirty percent (130%) or one hundred and thirty-five percent (135%) of the first value. The present disclosure, however, is not limited to the foregoing ratios between the first and the second values.

The variable area nozzle 30 of FIGS. 3A and 3B includes one or more variable area nozzle flaps 60A and 60B (generally referred to as "60"); e.g., halves, panels, etc. Each of the variable area nozzle flaps 60 is movably (e.g., pivotally) coupled to the propulsion system structure 28 at, for example, the passage second end 46. The first (e.g., top, upper) flap 60A may be (e.g., diametrically) opposed from the second (e.g., bottom, lower) flap 60B. The first flap 60A of FIG. 3A, for example, may be arranged and hinged at a first (e.g., top) side 62 of the propulsion system structure 28. The second flap 60B of FIG. 3A may be arranged and hinged at a second (e.g., bottom) side 64 of the propulsion system structure 28 that is opposite the first side 62.

In the first configuration of FIG. 3A, the variable area nozzle flaps 60 are arranged (e.g., pivoted inward) such that trailing edges 66A and 66B (generally referred to as "66") of the flaps 60 are separated by a first distance 68. In the second configuration of FIG. 3B, the variable area nozzle flaps 60 are arranged (e.g., pivoted outwards) such that the trailing edges 66 are separated by a second distance 70 that is greater than the first distance 68. The second distance 70, for example, may be at least one hundred and five percent (105%) or one hundred and ten percent (110%) of the first distance 68. For example, the second distance 70 may be between one hundred and five percent (105%) and one hundred and thirty percent (130%) of the first distance 68; e.g., one hundred and ten percent (110%), one hundred and fifteen percent (115%) or one hundred and twenty percent (120%) of the first distance 68. The present disclosure, however, is not limited to the foregoing ratios between the first and the second distances.

Where each of the variable area nozzle flaps 60 is pivotally coupled (e.g., hinged) to the propulsion system structure 28, each flap 60 may pivot an actuation angle 72 between the first disposition of FIG. 3A and the second disposition of FIG. 3B. This actuation angle 72 may be at least, for example, one degree (1°), three degrees)(3°) or five degrees (5°). The actuation angle 72, for example, may be between five degree (5°) and twenty degrees (20°); e.g., ten degrees (10°) or fifteen degrees (15°). The present disclosure, however, is not limited to the foregoing actuation angles.

Figure 4:
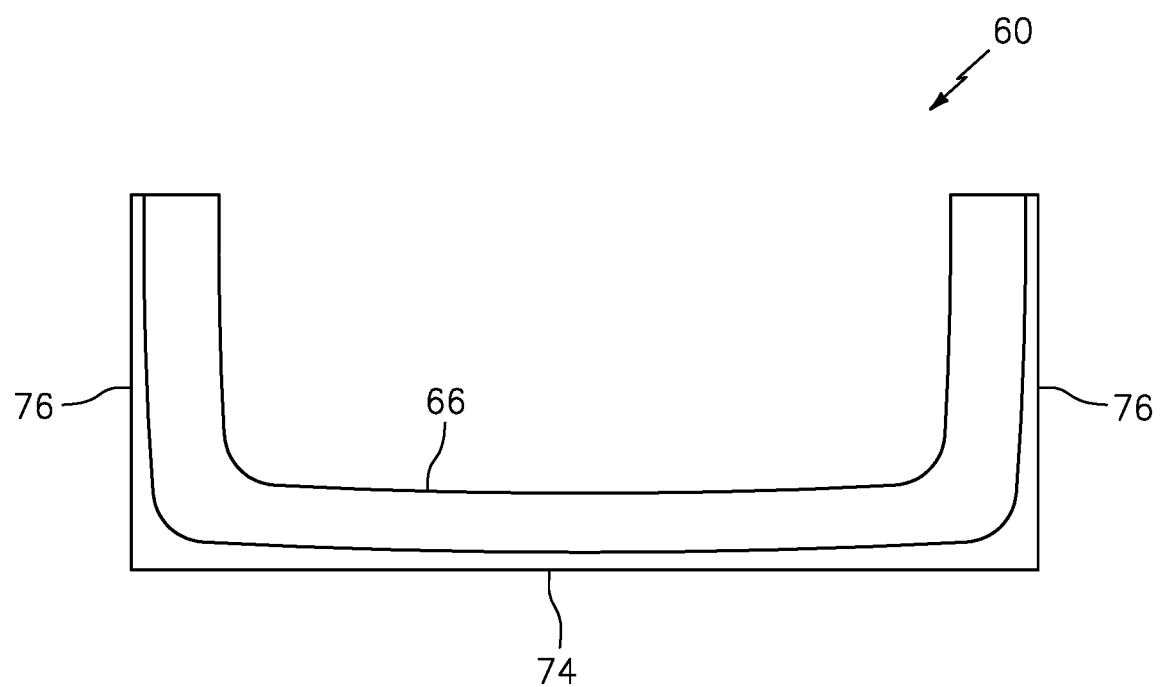
FIG. 4 is an illustration of a variable area nozzle flap.

Each variable area nozzle flap 60 of FIGS. 3A and 3B includes a base segment 74 and one or more side segments 76. Referring to FIG. 4, the base segment 74 extends laterally between and is connected to the side segments 76. Each of the side segments 76 projects out (in a common inward direction) from the base segment 74 to a respective distal end. Each variable area nozzle flap 60 may thereby have a generally C-channel or U-channel configuration. The present disclosure, however, is not limited to such an exemplary configuration as described below in further detail.

Referring to FIG. 2, the linkage system 32 is configured to mechanically link actuation and/or movement of an aircraft effector with actuation and/or movement of the variable area nozzle 30. The term "aircraft effector" may describe any component of the aircraft which controls, influences and/or changes a flight parameter. For example, in the embodiment of FIG. 2, the aircraft effector is configured as or otherwise includes the aircraft propulsion system 24. Furthermore, for ease of description, the aircraft effector is described below as being the aircraft propulsion system 24. The present disclosure, however, is not limited to such an exemplary effector configuration.

The linkage system 32 of FIGS. 5A-5F mechanically links/ties (a) the movement of the aircraft propulsion system 24 relative to the aircraft structure 22 with (b) actuation and/or movement of the variable area nozzle 30 such that, for example, the movement of the propulsion system structure 28 between its first and second positions (see FIGS. 5A and 5F) may drive and/or otherwise facilitate actuation and/or movement of the variable area nozzle 30 between its first and second configurations through the linkage system 32. The linkage system 32 may thereby passively drive actuation and/or movement of the variable area nozzle 30 and its flaps 60 through movement of the propulsion system structure 28 relative to the aircraft structure 22. In other words, a single actuation system (e.g., one or more electric, pneumatic and/or hydraulic actuators) that drives the movement of the propulsion system structure 28 between its first and second positions also indirectly drives movement of the variable area nozzle flaps 60 through the linkage system 32. By contrast, known prior art variable area nozzles required one or more dedicated actuation systems which may increase service, costs, complexity and/or weight of an aircraft.

The linkage system 32 of the present disclosure includes an assembly of linkage components that operatively couple various aircraft system components together. Examples of linkage components include, but are now limited to, a bell crank, a crank arm, a cam element, a pulley, a tension member (e.g., a belt, a cable, a rope, etc.), a track, a slider, a linkage (e.g., a fixed length arm, an adjustable length arm, a tie rod, a push rod, etc.), a pushrod, a gear, etc. Such linkage components operatively connect the variable area nozzle 30 and its flaps 60 to (a) the aircraft propulsion system 24 and its propulsion system structure 28 and to (b) the aircraft structure 22. The linkage system 32 may thereby move the variable area nozzle 30 and its flaps 60 between its first and second configurations as the propulsion system structure 28 moves (e.g., pivots) relative to the aircraft structure 22 between its first and second positions.

Figure 5A:
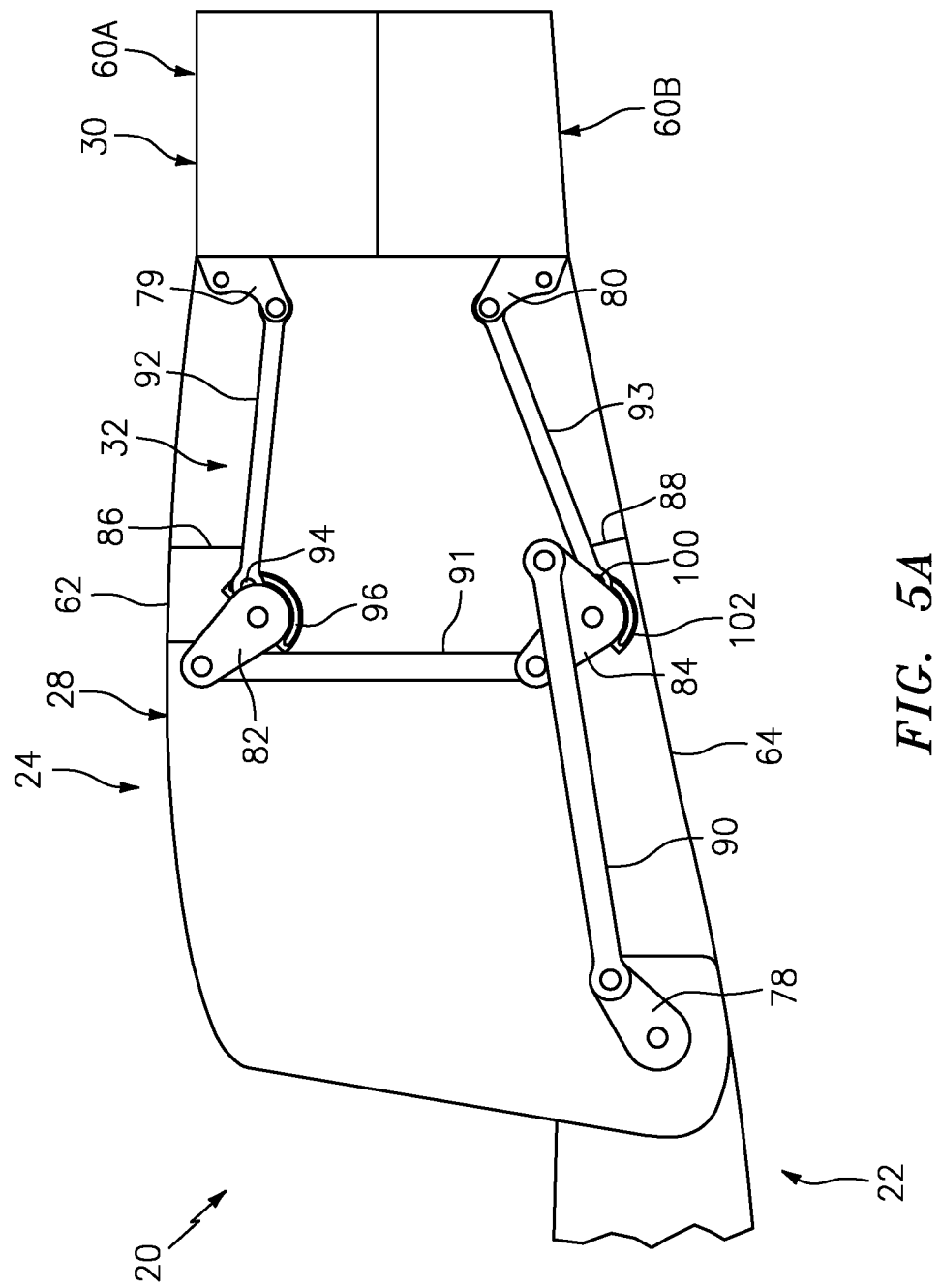
FIGS. 5A-5F illustrate a sequence for changing the configuration of the aircraft system from the first thrust configuration to the second thrust configuration.
Figure 5B:
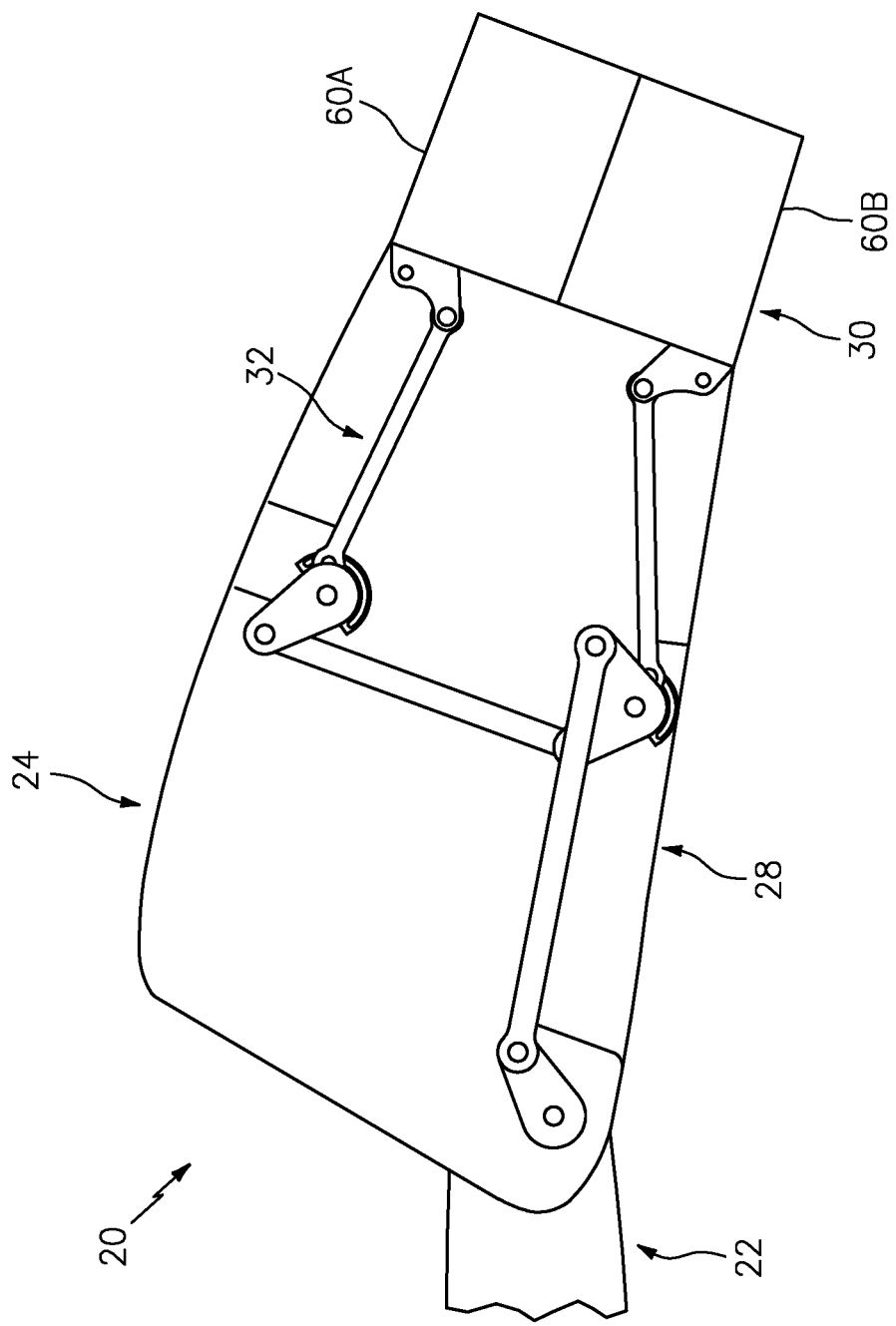
Figure 5C:
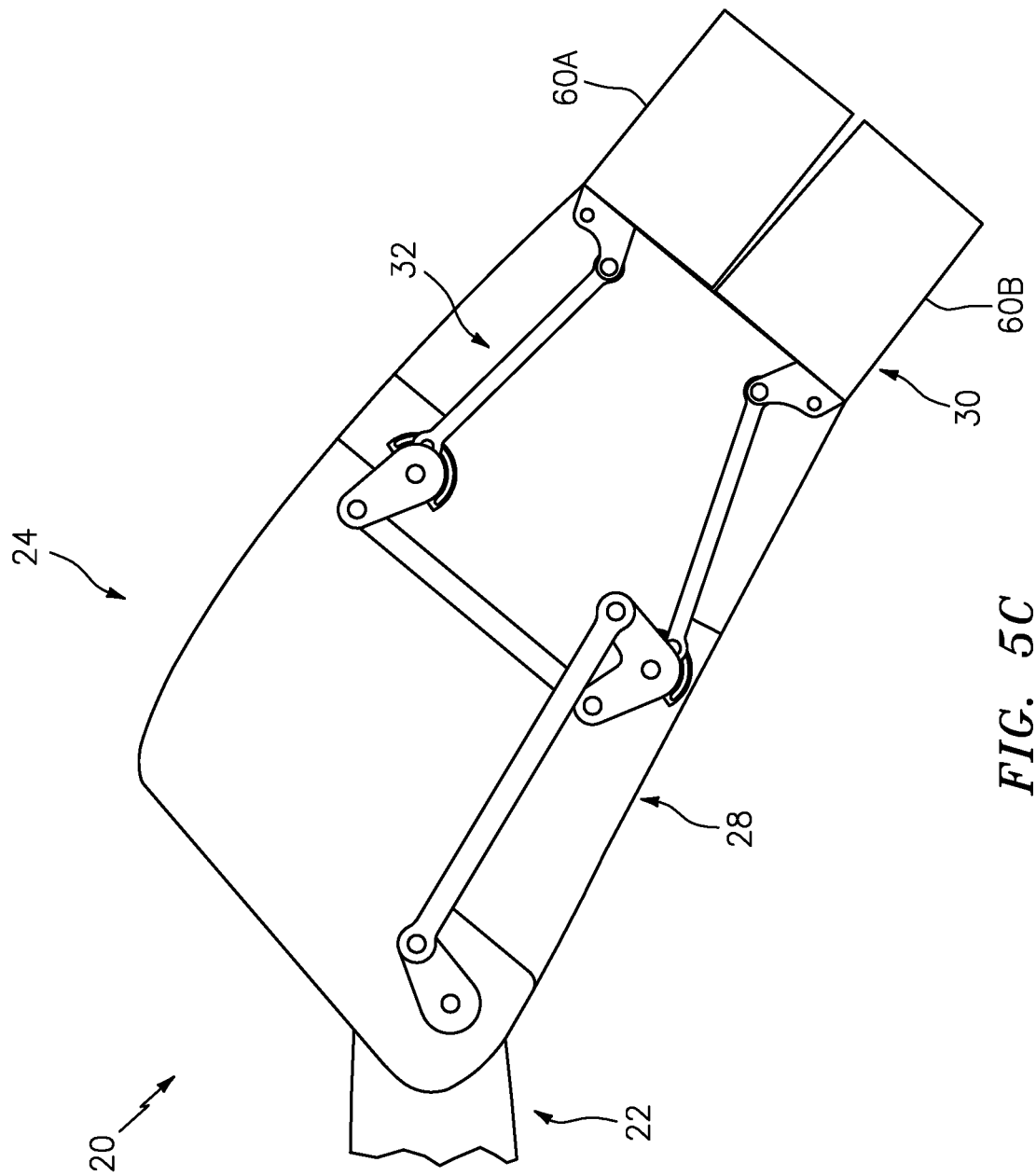
Figure 5D:
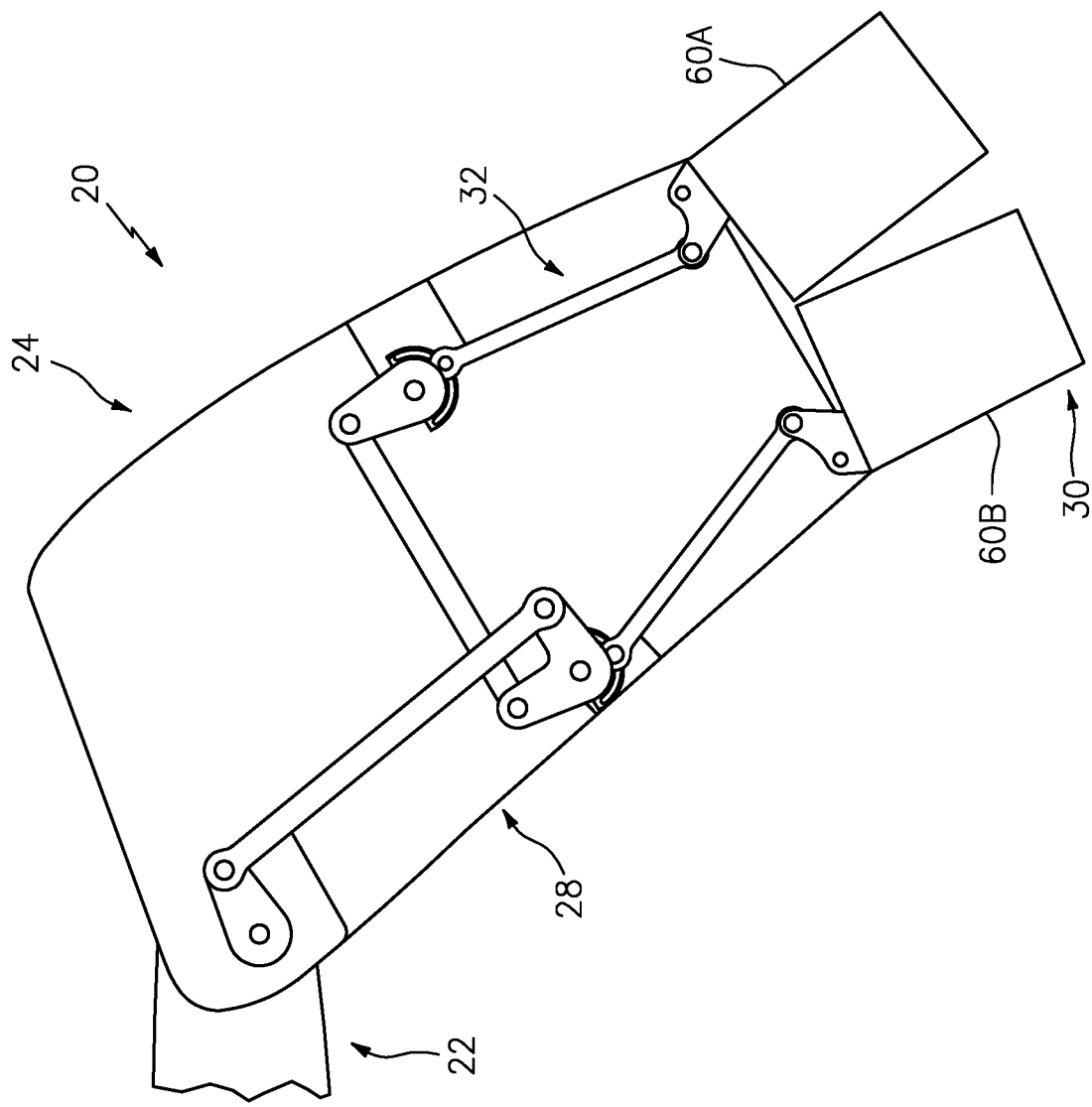
Figure 5E:
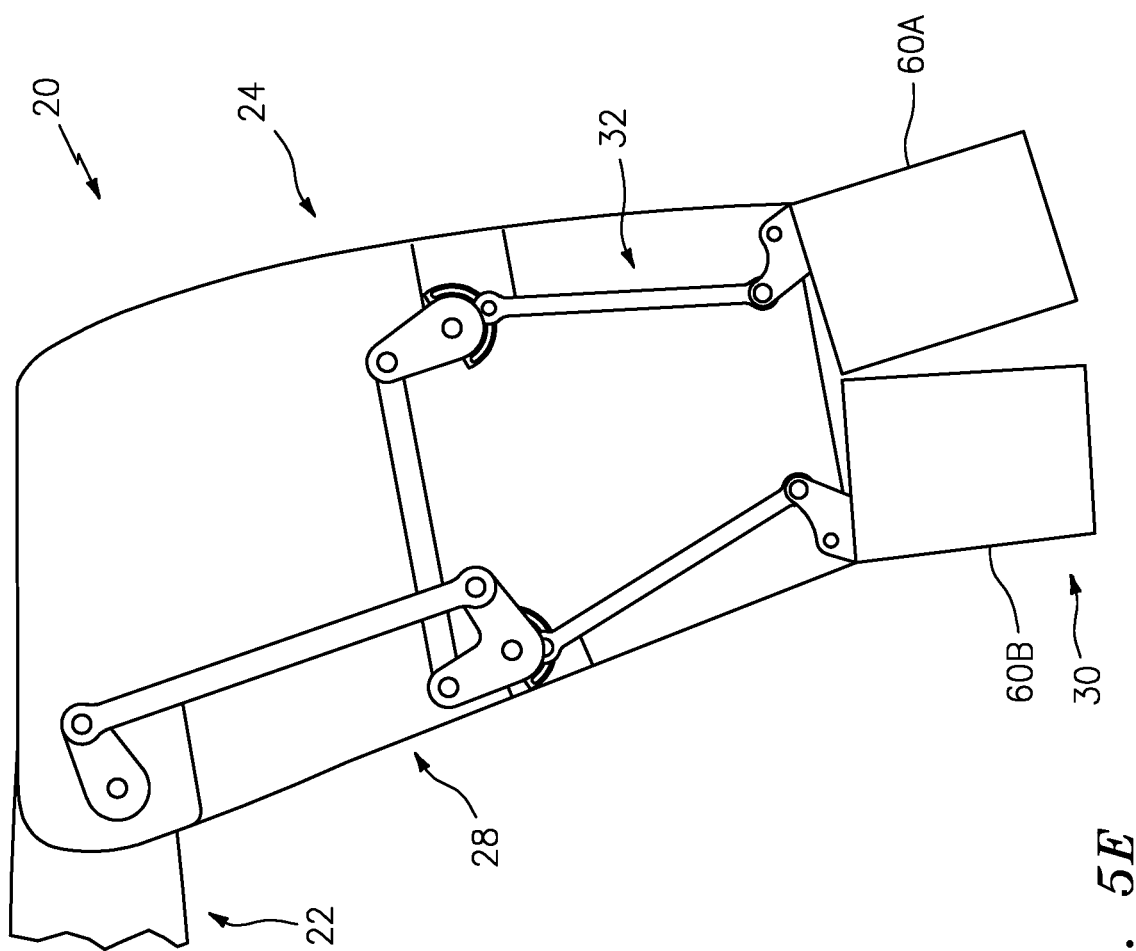
Figure 5F:
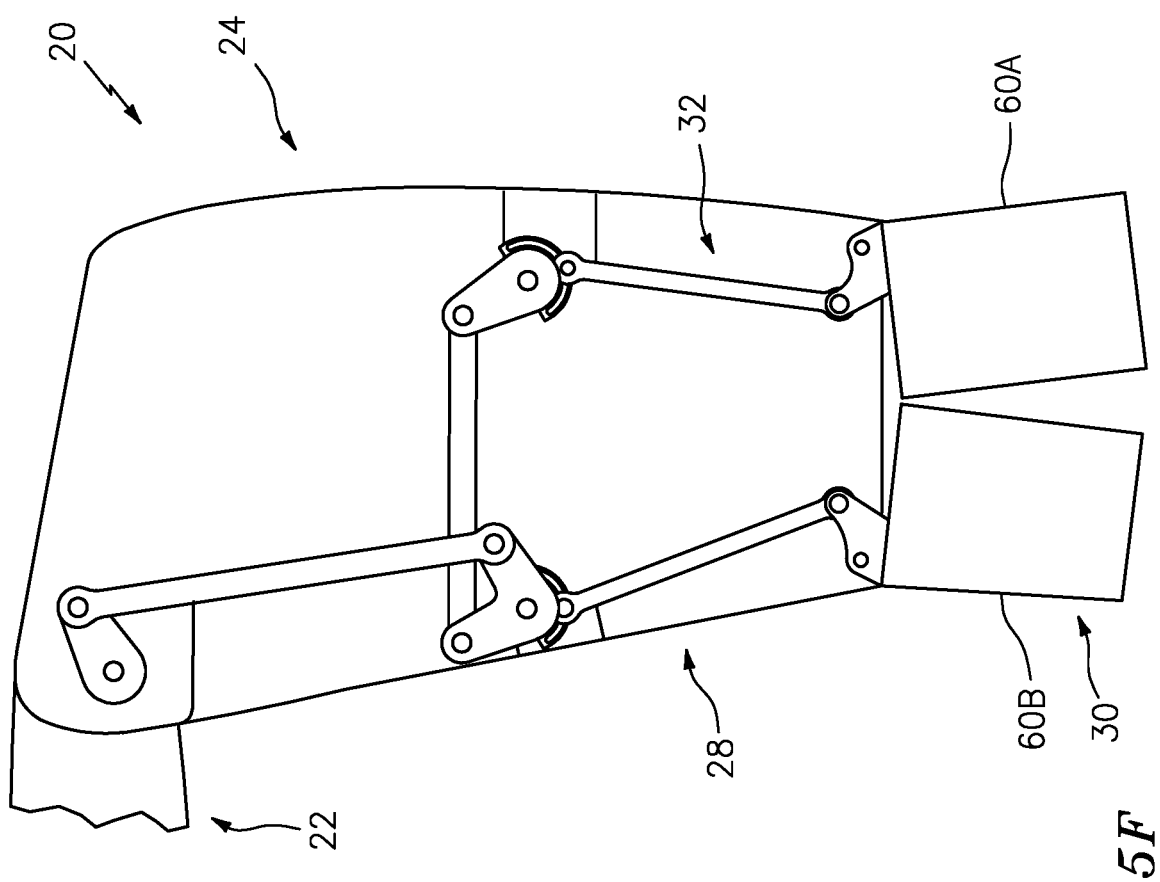
Figure 6A:
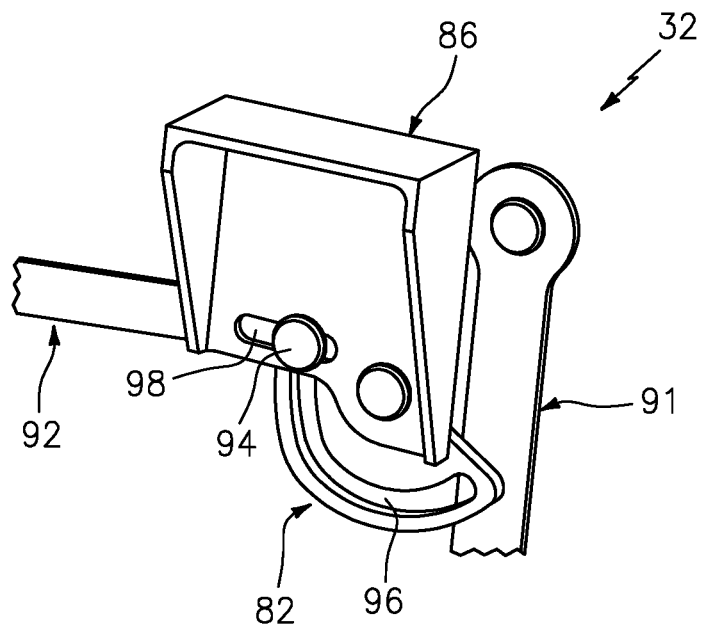
FIG. 6A is a perspective illustration of a portion of a linkage system that includes a first cam element.

The linkage components of FIG. 5A include one or more crank arms 78-80, one or more bell cranks 82 and 84, one or more track blocks 86 and 88 and one or more linkages 90-93. A base of the aircraft structure crank arm 78 is fixedly attached to the aircraft structure 22. A base of the first flap crank arm 79 is fixedly attached to the first flap 60A. A base of the second flap crank arm 80 is fixedly attached to the second flap 60B. A base of each of the bell cranks 82, 84 is pivotally attached (e.g., directly pinned, etc., etc.) to a respective one of the track blocks 86, 88; e.g., see also FIGS. 6A and 6B. Each track block 86, 88 of FIG. 5A is fixedly attached to the propulsion system structure 28. The first track block 86 is arranged at the first side 62 of the propulsion system structure 28. The second track block 88 is arranged at the second side 64 of the propulsion system structure 28. The driver linkage 90 extends (e.g., spans) between the aircraft structure crank arm 78 and the second bell crank 84. A first end of the driver linkage 90 is pivotally attached (e.g., directly pinned, etc., etc.) to an arm of the aircraft structure crank arm 78. A second end of the driver linkage 90 is pivotally attached (e.g., directly pinned, etc., etc.) to an arm of the second bell crank 84. The bridge linkage 91 extends (e.g., spans) between the first bell crank 82 and the second bell crank 84. A first end of the bridge linkage 91 is pivotally attached (e.g., directly pinned, etc., etc.) to an arm of the first bell crank 82. A second end of the bridge linkage 91 is pivotally attached (e.g., directly pinned, etc., etc.) to another arm of the second bell crank 84. The first follower linkage 92 extends (e.g., spans) between the first bell crank 82 and the first flap crank arm 79. A first end of the first follower linkage 92 is pivotally attached (e.g., directly pinned, etc., etc.) to a first slider 94, which slider 94 is mated with and slidable along a first cam track 96 (e.g., slot) configured in the first bell crank 82; see also FIG. 6A. The first slider 94 of FIG. 6A is also mated with and slidable along a track 98 (e.g., slot) configured in first track block 86.

Figure 6B:
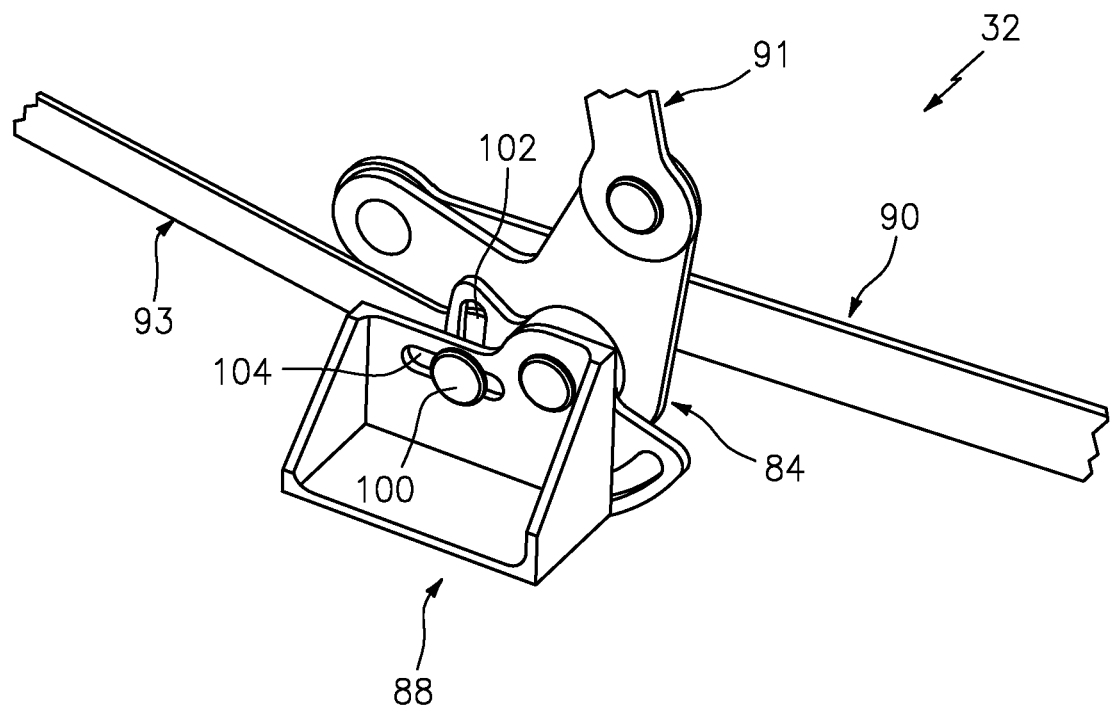
FIG. 6B is a perspective illustration of another portion of the linkage system that includes a second cam element.

A second end of the first following linkage 92 of FIG. 5A is pivotally attached (e.g., directly pinned, etc., etc.) to an arm of the first flap crank arm 79. The second follower linkage 93 extends (e.g., spans) between the second bell crank 84 and the second flap crank arm 80. A first end of the second follower linkage 93 is pivotally attached (e.g., directly pinned, etc., etc.) to a second slider 100, which slider 100 is mated with and slidable along a second cam track 102 (e.g., slot) configured in the second bell crank 84; see also FIG. 6B. The second slider 100 of FIG. 6B is also mated with and slidable along a track 104 (e.g., slot) configured in second track block 88. A second end of the second following linkage 93 of FIG. 5A is pivotally attached (e.g., directly pinned, etc.) to an arm of the second flap crank arm 80.

Figure 7:
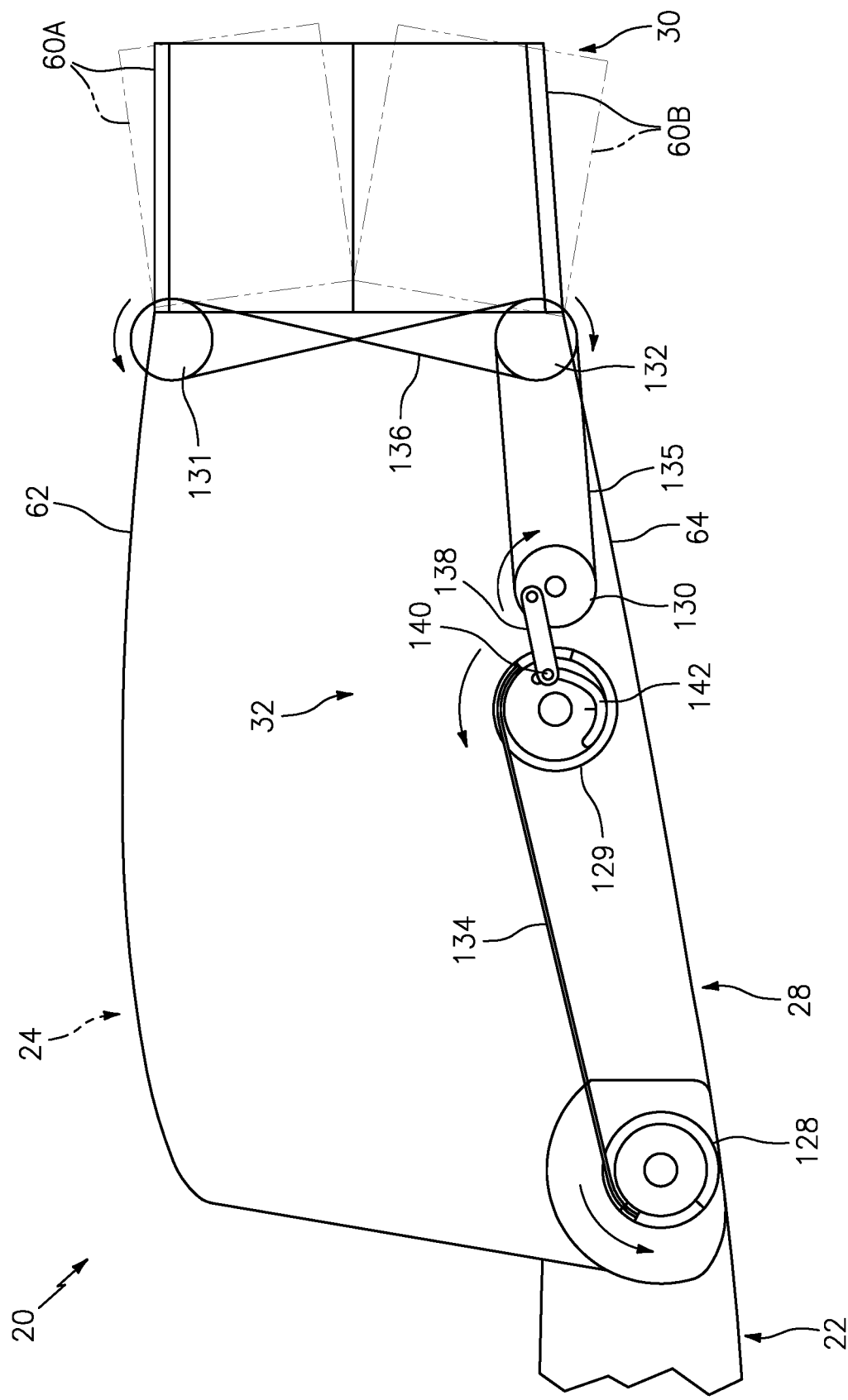
FIG. 7 is a side sectional illustration of the aircraft system configured with another linkage system.

With the foregoing assembly of linkage components, the linkage system 32 is configured to translate relative motion between the propulsion system structure 28 and the aircraft structure 22 into motion of the variable area nozzle flaps 60 as shown in FIGS. 5A-5F. Furthermore, referring to FIG. 5A, by coupling the bell cranks 82, 84 to the follower linkages 92, 93 via cams (e.g., the cam tracks 96, 102), the linkage system 32 is configured with a variable area nozzle delay mechanism. The configuration of the cam tracks 96, 102, for example, enables a delayed movement (e.g., opening) of the variable area nozzle flaps 60A, 60B until the propulsion system structure 28 moves (e.g., pivots) from an intermediate position towards the second position, where the intermediate position (see FIG. 5B) is between the first position (see FIG. 5A) and the second position (see FIG. 5F). The intermediate position, for example, may be at least between ten to thirty degrees (e.g., about twenty degrees) of propulsion system 24 rotation from the first position towards the second position; however, the present disclosure is not limited thereto. Other examples of the linkage system 32 with such delay mechanisms are illustrated in FIG. 7. The present disclosure, however, is not limited to such a delayed actuation. For example, in the embodiment of FIG. 8, the linkage system 32 is configured to move (e.g., open) the variable area nozzle flaps 60 as the propulsion system structure 28 moves (e.g., pivots) from the first position towards the second position.

The linkage system 32 of FIG. 7 includes one or more pulleys 128-132 (e.g., sheaves), one or more tension members 134-136 (e.g., belts, cables, ropes, etc.) and at least one linkage 138. The driver pulley 128 is fixedly attached to the aircraft structure 22. Each of the pulleys 129, 130 is rotatably attached to the propulsion system structure 28. The first flap pulley 131 is fixedly attached to the first flap 60A. The second flap pulley 132 is fixedly attached to the second flap 60B. The driver tension member 134 is engaged with (e.g., contacts and wraps at least partially around) and extends between the driver pulley 128 and the second pulley 129. The follower tension member 135 is engaged with (e.g., contacts and wraps at least partially around) and extends between the third pulley 130 and the second flap pulley 132. The timing tension member 136 is engaged with (e.g., contacts and wraps at least partially around) and extends between the first flap pulley 131 and the second flap pulley 132. Note, the timing tension member 136 is configured with a twist such that the first flap pulley 131 and the second flap pulley 132 rotate in opposite directions. The linkage 138 extends (e.g., spans) between the second pulley 129 and the third pulley 130. A first end of the linkage 138 is pivotally attached (e.g., directly pinned, etc.) to a slider 140, which slider 140 is mated with and slidable along a cam track 142

(e.g., slot) configured in the second pulley 129. A second end of the linkage 138 is pivotally attached (e.g., directly pinned, etc.) to the third pulley 130.

Figure 8:
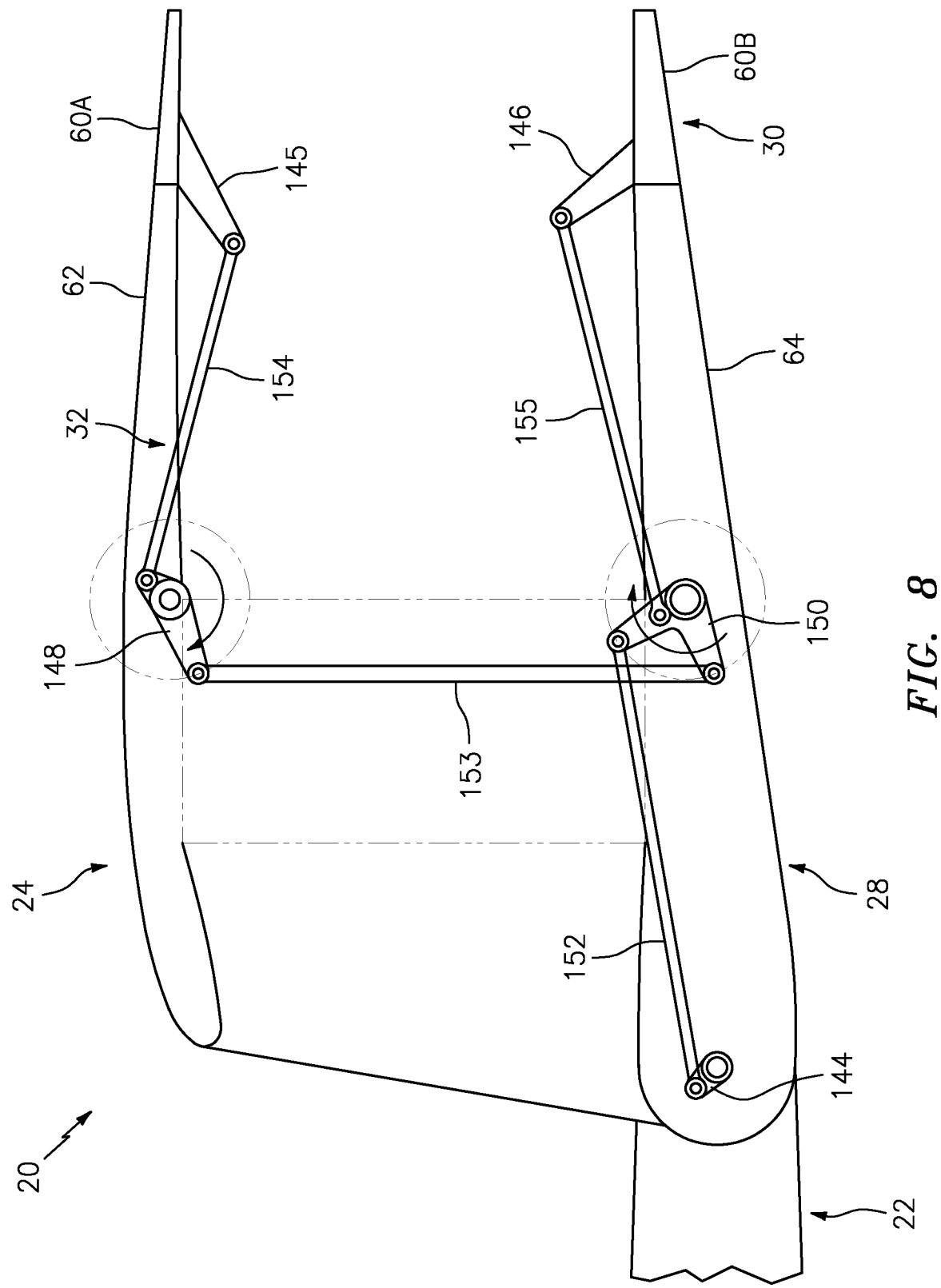
FIG. 8 is a side sectional illustration of the aircraft system configured with still another linkage system.

The linkage system 32 of FIG. 8 includes one or more crank arms 144-146, one or more bell cranks 148 and 150 and one or more linkages 152-155. A base of the aircraft structure crank arm 144 is fixedly attached to the aircraft structure 22. A base of the first flap crank arm 145 is fixedly attached to the first flap 60A. A base of the second flap crank arm 146 is fixedly attached to the second flap 60B. The bell cranks 148 and 150 are arranged to the opposing sides 62 and 64 of the propulsion system structure 28. A base of each of the bell cranks 148, 150 is pivotally attached (e.g., directly pinned, etc.) to the propulsion system structure 28. The driver linkage 152 extends (e.g., spans) between the aircraft structure crank arm 144 and the second bell crank 150. A first end of the driver linkage 152 is pivotally attached (e.g., directly pinned, etc.) to an arm of the aircraft structure crank arm 144. A second end of the driver linkage 152 is pivotally attached (e.g., directly pinned, etc.) to an arm of the second bell crank 150. The bridge/timing linkage 153 extends (e.g., spans) between the first bell crank 148 and the second bell crank 150. A first end of the bridge linkage 153 is pivotally attached (e.g., directly pinned, etc.) to an arm of the first bell crank 148. A second end of the bridge linkage 153 is pivotally attached (e.g., directly pinned, etc.) to another arm of the second bell crank 150. The first follower linkage 154 extends (e.g., spans) between the first bell crank 148 and the first flap crank arm 145. A first end of the first follower linkage 154 is pivotally attached (e.g., directly pinned, etc.) to another arm of the first bell crank 148. A second end of the first following linkage 154 is pivotally attached (e.g., directly pinned, etc.) to an arm of the first flap crank arm 145. The second follower linkage 155 extends (e.g., spans) between the second bell crank 150 and the second flap crank arm 146. A first end of the second follower linkage 155 is pivotally attached (e.g., directly pinned, etc.) to, for example, an inner portion of the arm of the second bell crank 150. A second end of the second following linkage 155 is pivotally attached (e.g., directly pinned, etc.) to an arm of the second flap crank arm 146.

In some embodiments, the aircraft propulsion system 24 may be configured with a single propulsor 26 and a single passage 40 as generally described above. However, in other embodiments, the aircraft propulsion system 24 may include more than one propulsor 26 and more than one passage 40; e.g., a dedicated passage 40 for each propulsor 26.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An aircraft system, comprising:
 a propulsion system structure comprising a duct, the propulsion system structure adapted to move between a first position and a second position;
 a variable area nozzle fluidly coupled with the duct, the variable area nozzle adapted to move between a first configuration and a second configuration, an exit area of the variable area nozzle having a first value when the variable area nozzle is in the first configuration, the exit area of the variable area nozzle having a second value when the variable area nozzle is in the second configuration, and the variable area nozzle comprising a flap moveably connected to the propulsion system structure; and
 a linkage system configured to mechanically link movement of the variable area nozzle between the first configuration and the second configuration with movement of the propulsion system structure between the first position and the second position, the linkage system comprising a driver linkage, a first bell crank, a bridge linkage, a second bell crank, a follower linkage and a crank arm, the first bell crank coupling the driver linkage to the bridge linkage, the second bell crank coupling the bridge linkage to the follower linkage, and the crank arm coupling the follower linkage to the flap.

2. The aircraft system of claim 1, wherein
 the variable area nozzle further comprises a second flap moveably connected to the propulsion system structure;
 the linkage system further comprises a second follower linkage and a second crank arm;
 the first bell crank further couples the driver linkage to the second follower linkage; and
 the second crank arm couples the second follower linkage to the second flap.

3. The aircraft system of claim 1, wherein
 the linkage system further comprises an aircraft structure crank arm; and
 the driver linkage couples the aircraft structure crank arm to the first bell crank.

4. The aircraft system of claim 3, further comprising:
 a stationary structure;
 the propulsion system structure movably connected to the stationary structure; and
 the aircraft structure crank arm fixedly attached to the stationary structure.

5. The aircraft system of claim 1, wherein the movement of the propulsion system structure between the first position and the second position drives the movement of the variable area nozzle between the first configuration and the second configuration.

6. The aircraft system of claim 1, wherein movement of the variable area nozzle from the first configuration towards the second configuration begins when the propulsion system structure moves from the first position towards the second position.

7. The aircraft system of claim 1, wherein movement of the variable area nozzle from the first configuration towards the second configuration begins when the propulsion system structure moves from an intermediate position towards the second position, and the intermediate position is between the first position and the second position.

8. The aircraft system of claim 1, further comprising:
 a stationary structure;
 the linkage system coupled to the stationary structure, the propulsion system structure and the variable area nozzle; and
 the linkage system adapted to move the variable area nozzle between the first configuration and the second configuration as the propulsion system structure moves relative to the stationary structure between the first position and the second position.

9. The aircraft system of claim 8, wherein the propulsion system structure is movably connected to the stationary structure.

10. The aircraft system of claim 1, wherein the linkage system further comprises a track and a slider mated with and slidable along the track.

11. The aircraft system of claim 1, further comprising:
a fixed structure;
the propulsion system structure pivotally coupled to the fixed structure such that the propulsion system structure pivots between the first position and the second position.

12. The aircraft system of claim 1, wherein
the variable area nozzle further comprises a second flap;
the first flap is pivotally coupled to the propulsion system structure at a first side of the propulsion system structure; and
the second flap is pivotally coupled to the propulsion system structure at a second side of the propulsion system structure that is opposite the first side of the propulsion system structure.

13. The aircraft system of claim 1, further comprising:
a propulsor of an aircraft propulsion system;
the propulsor housed within the propulsion system structure.

14. The aircraft system of claim 1, wherein a centerline of the duct when the propulsion system structure is in the first position is angularly offset from the centerline of the duct when the propulsion system structure is in the second position.

* * * * *